US006289054B1

(12) United States Patent
Rhee

(10) Patent No.: US 6,289,054 B1
(45) Date of Patent: Sep. 11, 2001

(54) METHOD AND SYSTEMS FOR DYNAMIC HYBRID PACKET LOSS RECOVERY FOR VIDEO TRANSMISSION OVER LOSSY PACKET-BASED NETWORK

(75) Inventor: Injong Rhee, Raleigh, NC (US)

(73) Assignee: North Carolina University, Raleigh, NC (US)

( * ) Notice: Subject to any disclaimer, the term of this patent is extended or adjusted under 35 U.S.C. 154(b) by 0 days.

(21) Appl. No.: 09/560,409

(22) Filed: Apr. 27, 2000

Related U.S. Application Data

(63) Continuation-in-part of application No. 09/079,621, filed on May 15, 1998, now Pat. No. 6,104,757.

(51) Int. Cl.[7] .............................. H04N 7/64; H04N 7/36
(52) U.S. Cl. .............................. 375/240.27; 375/240.12; 714/18; 714/48
(58) Field of Search .............................. 375/240, 240.27, 375/240.12; 714/18, 48; H04N 7/36, 7/64

(56) References Cited

U.S. PATENT DOCUMENTS

| | | | |
|---|---|---|---|
| 5,680,322 | * 10/1997 | Shinoda | 714/18 |
| 5,767,907 | * 6/1998 | Pearlstein | 348/407 X |
| 5,794,018 | * 8/1998 | Vrvilo et al. | 713/400 |
| 6,104,757 | * 8/2000 | Rhee | 375/240.12 |

OTHER PUBLICATIONS

RHEE ET AL., "FEC–Based Loss Recovery for Interactive Video Transmission," Proceedings of IEEE International Conference on Multimedia Computing and Systems, vol. 1, p. 205–256, Florence, Italy, (Jun. 1999).

RHEE, "Error Control Techniques for Interactive Low–Bit Rate Video Transmission Over the Internet," Proceeding of the ACM SIGCOMM '98, pp. 290–301, (Sep. 1998).

RHEE, "Retransmission–Based Error Control for Interactive Video Applications Over the Internet," Proceedings of International Conference on Multimedia Computing and Systems, pp. 118–127, (Jun. 1998).

TALLURI, "Error–Resilient Video Coding in ISO MPEG–4 Standard," IEEE Communication Magazine, vol. 36 (No. 6), pp. 112–119, (Jun. 1998).

PODOLSKY ET AL., "Simulation of FEC–Based Error Control for Packet Audio on the Internet,"Proceedings of the ACM SIGMETRIC/PERFORMANCE, pp. 505–515, (Jun. 1998).

CARLE ET AL., "Survey of Error Recovery Techniques for IP–Based Audio Visual Multicast Applications," IEEE Network, pp. 24–36, (Dec. 1997).

MCCANNE ET AL., "Low–Complexity Video Coding for Receiver4–Driven Layered Multicast," IEEE Journal on Selected Areas in Communications, vol. 16 (No. 6),pp. 983–1001, (Aug. 1997).

(List continued on next page.)

*Primary Examiner*—Howard Britton
(74) *Attorney, Agent, or Firm*—Jenkins & Wilson, P.A.

(57) ABSTRACT

Methods and systems for performing packet loss recovery when transmitting compressed video over a lossy packet-based network include transmitting packets of compressed video data from a sender to a receiver. In response to detecting lost or erroneously received packets, the receiver transmits a retransmission request to the sender. In response to receiving the retransmission request, the sender changes the periodic temporal dependency distance of a frame to be transmitted such that the frame depends on the frame associated with the retransmitted packets. The receiver receives the retransmitted packets and restores the frame corresponding the retransmitted packets in a frame buffer. The receiver uses the restored frame to decode a frame transmitted after the retransmitted packets.

37 Claims, 12 Drawing Sheets

OTHER PUBLICATIONS

MPEG97, "Description of Error Resilient Core Experiments," International Organization for Standardization, (Jul. 25, 1997).

LI ET AL., "Layered Video Multicast with Retransmission (LVMR): Evaluation of Error Recovery Schemes," Proceedings of the Sixth International Workshop on Network and Operating System Support for Digital Audio and Video, pp. 1–5, (May 1997).

XU ET AL., "Resilient Multicast Support for Continuous–Media Applications," Proceedings of the Sixth International Workshop on Network and Operating System Support for Digital Audio and Video, (May 1997).

RIZZO, "Effective Erasure Codes for Reliable Computer Communication Protocols," Computer Communication Review, vol. 27 (No. 2), pp. 24–36, (Apr. 1997).

GHANBARI, "Postprocessing of Late Cells for Packet Video," IEEE Transactions on Circuits and Systems for Video Technology, Vel. 6 (No. 6), pp. 669–678, (Dec. 1996).

ALBANESE ET AL., "Priority Encoding Transmission," IEEE Transactions on Information Theory, vol. 42 (No. 6), pp. 1737–1744, (Nov. 1996).

YAJNIK ET AL., "Packet Loss Correlation in the Mbone Multicast Network," Proceeding of IEEE Globecom '96, (Nov. 1996).

ALON ET AL., "A Linear Time Erasure–Resilient Code with Nearly Optimal Recovery," IEEE Transactions on Information Theory, vol. 42 (No. 6), pp. 1732–1736, (Nov. 1996).

PAPADOPOULOS ET AL., "Retransmission–Based Error Control for Continuous Media Applications," Proceedings of the Sixth International Workshop on Network and Operating System Support for Digital Audio and Video, pp. 5–12, (Feb. 1996).

LIU ET AL., "Performance of Video Transport Over Wireless Networks Using Hybrid ARQ," Proceedings of IEEE International Conference on Universal Personal Communications (ICUPC), pp. 567–571, (Oct. 1996).

BOLOT ET AL., "Adaptive Error Control for Packet Video in the Internet," Proceedings of International Conference on Internet Protocols, pp. 25–28, (Sep. 1996).

AMIR ET AL., "A Layered DCT Coder for Internet Video," The Proceedings of IEEE International Conference on Image Processing, (Sep. 1996).

MCCANNE ET AL., "Receiver–Driven Layered Multicast," Proceedings of ACM SIGCOMM, pp. 117–130, (Aug. 1996).

HAN ET AL., "Multi–Resolution Layered Coding for Real–Time Image Transmission: Architectural and Error Control Considerations," Academic Press, pp. 1–18, (Mar. 28, 1996).

DEMPSEY ET AL., "On Retransmission–Based Error Control for Continuous Media Traffic in Packet–Switching Networks," Computer Networks and ISDN Systems, pp. 1–24, (Feb. 1996).

CASNER, ET AL., "RTP: A Transport Protocol for Real Time Applications,"RFC 1889, (Jan. 1996).

MCCANNE ET AL., "vic: A Flexible Framework for Packet Video," Proceedings of ACM Multimedia '95, p. 511–522, (Nov. 1995).

LUO ET AL., "Analysis of Error Concealment Schemes for MPEG–2 Video Transmission Over ATM Based Networks," Proceedings of the SPIE/IEEE Visual Communications and Image Processing, pp. 1358–1368, (May 28, 1995).

RAMAMURTHY ET AL., "Performance of Packet Video with Combined Error Recovery and Concealment," Proceedings of the IEEE INFOCOM, pp. 753–761, (Apr. 1995).

DENG ET AL., "A Type I Hybrid ARQ System with Adaptive Code Rates," IEEE Transactions on Communications, vol. 43 (No. 2–4), pp. 733–737, (Feb. 1995).

POZNAK ET AL., "Techniques for Resilient Transmission of JPEG Video Streams," The Proceedings of Multimedia Computing and Networking, (Feb. 1995).

KHANSARI ET AL., "Approaches to Layered Coding for Dual–Rate Wireless Video Transmission," (Feb. 1994).

DORCEY, "CU–SeeMe Desktop VideoConferencing Software," ConneXions, vol. 9 (No. 3), (Mar. 1995).

ZORZI ET AL., "Capture and Retransmission Control in Mobile Radio," IEEE Journal on Selected Areas in Communications, vol. 12 (No. 8), pp. 1289–1298, (Oct. 1994).

KIEU ET AL., "Cell–Loss Concealment Techniques for Layered Video Codecs in an ATM Network," IEEE Transactions on Image Processing, vol. 3 (No. 5), pp. 666–677, (Sep. 1994).

BOLOT, "Characterizing End–to–End Packet Delay and Loss in the Internet," Journal of High–Speed Networks, vol. 2 (No. 3), pp. 305–323, (Dec. 1993).

GHANBARI ET AL., "Cell–Loss Concealment in ATM Video Codecs," IEEE Transactions on Circuits and Systems for Video Technology, vol. 3 (No. 3), pp. 238–247, (Jun. 1993).

BIERSACK, "Performance Evaluation of Forward Error Correction in an ATM Environment," IEEE Journal on Selected Areas in Communications, vol. 11 (No. 4), pp. 631–640 (May 1993).

BOLOT ET AL., "The Case for FEC–Based Error Control for Packet Audio in the Internet,"ACM Multimedia Systems Journal, pp. 1–13.

KALLEL ET AL., "Generalized Type II Hybrid ARQ Scheme Using Punctured Convolutional Coding." IEEE Transactions on Communications, vol. 38 (No.11), pp. 1938–1946, (Nov. 1990).

MCAULEY, "Reliable Broadband Communication Using A Burst Erasure Correcting Code," Proceedings of the ACM SIGCOMM, pp. 297–306, (Sep. 1990).

GHANBARI, "Two–Layer Coding of Video Signals for VBR Networks," IEEE Journal on Selected Areas in Communications, vol. 7 (No. 5), pp. 771–781, (Jun. 1989).

HAGENAUER, "Rate–Compatible Punctured Convolutional Codes (RCPC Codes) and their Applications," IEEE Transactions on Communications, vol. 35 (No. 4), pp. 389–400, (Apr. 1988).

NONNENMACHER ET AL., "Parity–Based Loss Recovery for Reliable Multicast Transmission," IEEE ACM Transactions on Networking, pp. 349–361, (Aug. 1998).

RUBENSTEIN ET AL., "Real–Time Reliable Multicast Using Proactive Forward Error Correction," IEEE NOSSDAV '98, pp. 1–15, Cambridge, United Kingdom, (Jul. 1998).

WADA, "Selective Recovery of Video Packet Loss Using Error Concealment," IEEE Journal on Selected Areas in Communications, vol. 7 (No. 5), pp. 807–814, (Jun. 1989).

* cited by examiner

METHOD AND SYSTEMS FOR DYNAMIC HYBRID PACKET LOSS RECOVERY FOR VIDEO TRANSMISSION OVER LOSSY PACKET-BASED NETWORK

RELATED APPLICATION INFORMATION

This application is a continuation-in-part of U.S. patent application Ser. No. 09/079,621 filed May 15, 1998 now U.S. Pat. No. 6,104,757, the disclosure of which is incorporated herein by reference in its entirety

TECHNICAL FIELD

The present invention relates generally to methods and systems for transmitting video over a lossy packet-based network. More particularly, the present invention relates to methods and systems for dynamic hybrid packet loss recovery for video transmission over a lossy packet-based network.

BACKGROUND ART

Packet losses are common in a lossy packet-based network, such as the Internet. For example, during high-traffic time periods, about 5% to 10% packet losses over connections between the east and west coasts of the United States, or over trans-Atlantic or trans-Pacific connections are not unusual. Since packet losses in a lossy packet-based network, such as the current best effort delivery Internet, cannot be avoided, applications such as Internet-based video telephony must be structured to be tolerant of packet loss.

Unfortunately, the quality of compressed video is very susceptible to packet loss because of motion estimation employed in video compression. Motion estimation is the process of estimating the displacement of moving objects in a video sequence. Motion estimation is currently used in popular video compression and decompression algorithms, commonly referred to as codecs, such as H.261, H.263, MPEG-1, MPEG-2, and MPEG-4, to remove temporal redundancy in successive video frames. The temporal redundancy is removed by encoding only pixel value differences between the current image and its motion-predicted image reconstructed from a previously encoded image. The previously encoded image is referred to as a reference frame or R-frame. In these codecs, loss of packets for a particular video frame manifests itself not only in the reduced quality of the frame in which the loss occurs, but also in subsequent frames due to propagation of distortion to the successive frames that reference, either directly or indirectly, the erroneously received frame. This problem is referred to as the error propagation or error spread problem.

Most of the conventional work on loss recovery focuses on recovering packet losses using retransmission and forward error correction before the scheduled displayed times of the video frames contained in the lost packets. However, this approach is ineffective for interactive video because of the delays in detecting and repairing the losses. For example, in order to allow time for loss detection and repair, existing techniques introduce delay in the frame display times. Delaying the frame display times greatly impairs the effectiveness of interactive video communication.

The above-referenced parent U.S. patent application, entitled "RECOVERY FROM ERROR SPREAD USING CONTINUOUS UPDATES (RESCU)," discloses methods and systems for preventing error spread. Unlike conventional techniques, RESCU focuses on eliminating error propagation instead of preventing errors due to packet loss before display of a particular video frame. In a lossy packet-based network, such as today's Internet, where packet losses and high network latency are common, recovering lost packets before the display times of the frames associated with the packets is not always possible. Therefore, some repair packets might arrive after the display times of the associated video frames. Conventional techniques discard these late repair packets. In contrast, RESCU can use the repair packets to stop error propagation. Stopping error propagation is accomplished by buffering displayed frames, restoring the buffered frames when repair packets arrive, and using the buffered frames as reference frames for subsequent frames.

The main benefit of RESCU is that it allows more time for transport-level recovery to succeed. That is, repair packets for a frame are useful until that frame is being used as a reference frame. In order to accommodate recovery delays, RESCU designates every $P^{th}$ frame, P being an integer, as a periodic frame. The number of frame intervals between two consecutive periodic frames is referred to as the periodic temporal dependency distance (PTDD). Every frame between periodic frames references only its immediately preceding periodic frame. Such frames are referred to as non-periodic frames.

FIG. 1 illustrates an example of RESCU picture coding with a PTDD value of 2 according to the algorithms described in the above-referenced parent application. In FIG. 1, blocks $F_0$ through $F_6$ represent frames. Blocks $F_0$, $F_2$, $F_4$ and $F_6$ are periodic frames. Blocks $F_1$, $F_3$ and $F_5$ are non-periodic frames. As illustrated in FIG. 1, the periodic temporal dependency distance is measured from the start of one periodic frame to the next periodic frame. In the illustrated example, the periodic temporal dependency distance is equal to two frames.

When packet losses occur during transmission of a periodic frame, repair packets can be transmitted to repair the losses. The repair packets can be retransmitted packets or forward error correction (FEC) packets that arrive before the decoding time of the next periodic frame. If the FEC or retransmitted packets arrive before the decoding of the next periodic frame, error propagation can be stopped by using the repair packets to repair the reference frame of the next periodic frame. For example, in FIG. 1, if frame $F_0$ is transmitted with errors, and repair packets arrive before display of frame $F_2$, the repair packets can be used to repair the buffered $F_0$ before $F_0$ is used as a reference for frame $F_2$. Accordingly, error propagation due to errors in frame $F_0$ will not extend beyond frame $F_1$ Because frames do not reference non-periodic frames, loss in non-periodic frames does not cause error propagation. Since no attempts are made to restore non-periodic frames after display of the non-periodic frames, only periodic frames being recovered need to be buffered for future reference by succeeding periodic frames. This reduces the memory requirements for error recovery.

FIGS. 2 and 3 illustrate the benefits of RESCU. In FIG. 2, an error, indicated by distortion in the image of the person, that begins in periodic frame $F_0$ propagates to subsequent frames $F_1$, $F_2$, and $F_3$. In FIG. 3, RESCU is used with a periodic temporal dependency distance of 2. Accordingly, an error that occurs in $F_1$ is repaired before display of frame $F_2$. Accordingly, the error occurring in frame $F_1$ does not propagate to frame $F_2$ or successive frames.

Conventional applications of RESCU explore the effectiveness of RESCU using a fixed PTDD. The PTDD determines a deadline within which packets need to be recovered.

However, network conditions vary over time. For example, congestion, transmission latency, loss rates and available bandwidth frequently change. As network conditions change, the effectiveness of transport level recovery, i.e., retransmission and FEC, change, and thus the associated recovery delays change. Conventional techniques that utilize a fixed PTDD period are incapable of adapting to changing network conditions. Accordingly, there exists a long-felt need for methods and systems for adjusting the PTDD period to account for changing network conditions.

DISCLOSURE OF THE INVENTION

The methods and systems for performing packet loss recovery for video transmission over a lossy packet-based network according to the present invention include varying the PTDD value in response to network conditions to allow sufficient time for packets to be delivered before recovery of succeeding periodic frames. The PTDD value cannot be set arbitrarily large because this reduces compression efficiency. Thus, finding the minimum PTDD value under given network conditions that maximizes periodic frame recovery is an important aspect of the invention.

Packet loss rate, loss burst length, and transmission delays play an important role in determining PTDD. For example, if the loss rate increases, then additional FEC packets or retransmission attempts are required to maintain high loss recovery probabilities. Thus, the PTDD requires extension to accommodate time required for the increased number of repair attempts. Loss burst characteristics, i.e., the difference in time between successive losses, can also affect the PTDD. For example, as network traffic undergoes an increased number of burst losses, retransmission becomes more effective than forward error correction, since repair packets are transmitted only when losses occur. Hence, loss burst characteristics can influence the decision to use forward error correction, retransmission, or both for recovery. When retransmission is used, the PTDD must be at least as long as one round-trip time, i.e., the time for a packet to travel from the sender to the receiver and back. When forward error correction is used, the PTDD should be at least as long as the product of the time interval between two consecutive FEC packets and the number of FEC packets required for protecting a periodic frame. When a hybrid technique combining FEC and retransmission is used, finding the minimum PTDD value becomes even more complex. The present invention includes methods and systems for determining an optimal PTDD period in all of these situations.

According to one aspect, the present invention includes a dynamic algorithm for hybrid loss recovery, referred to herein as lazy hybrid RESCU. Based on current network conditions, this scheme determines: (1) when to retransmit a lost packet, (2) when and how many FEC packets to transmit, and (3) the length of the PTDD suitable to achieve good compression efficiency, as well as good error resilience. In this algorithm, retransmission is scheduled only when the sender learns that ensuing FEC packets are not sufficient to recover from reported packet losses. When repair packets are retransmitted, the PTDD is adjusted to allow these packets to arrive in time to stop error propagation. This strategy allows lazy hybrid RESCU to budget only a small amount of bit overhead for proactive recovery, i.e., overhead due to PTDD and FEC packets. Retransmission requires a larger PTDD because of network delays and larger bit overhead. However, in lazy hybrid RESCU, this overhead is incurred only when unanticipated burst losses occur and proactive recovery fails. This algorithm can perform well when packet loss characteristics illustrate a high degree of variability, such as in today's Internet.

Accordingly, it is an object of the present invention to provide methods and systems for dynamically adjusting a PTDD value in response to changing network conditions.

It is another object of the invention to provide an efficient mechanism for loss recovery when transmitting video over a lossy packet-based network.

Some of the objects of the invention having been stated hereinabove and which are achieved in whole or in part by the present invention, other objects will be evident as the description proceeds, when taken in connection with the accompanying drawings as best described hereinbelow.

BRIEF DESCRIPTION OF THE DRAWINGS

A description of preferred embodiments of the present invention will now proceed with reference to the accompanying drawings of which.

DETAILED DESCRIPTION OF THE INVENTION

System Architecture

Figure 1:
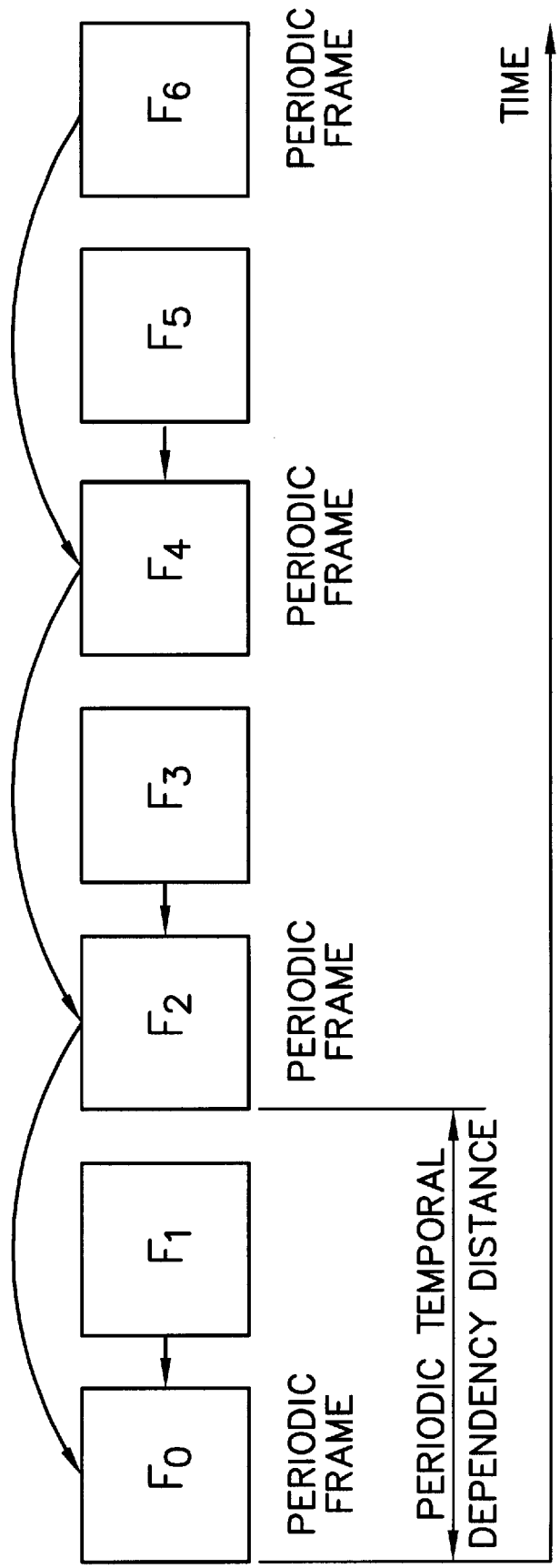
FIG. 1 is a block diagram illustrating RESCU picture coding with a PTDD value of 2.
Figure 2:
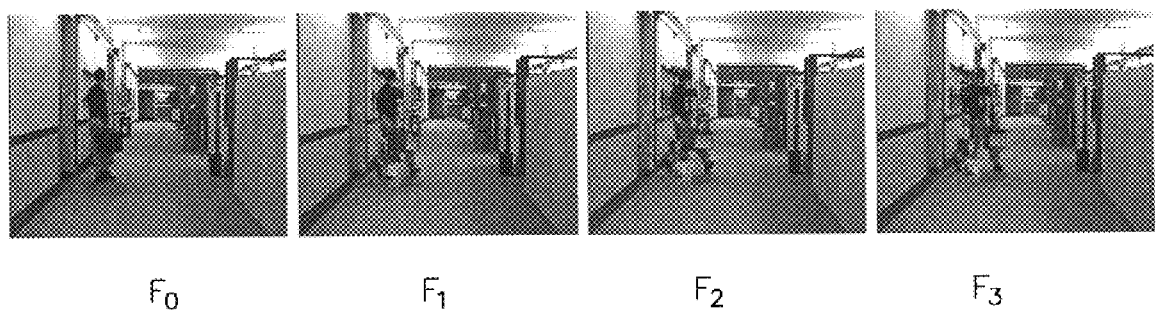
FIG. 2 is a computer-generated image of successive video frames illustrating error propagation.
Figure 3:
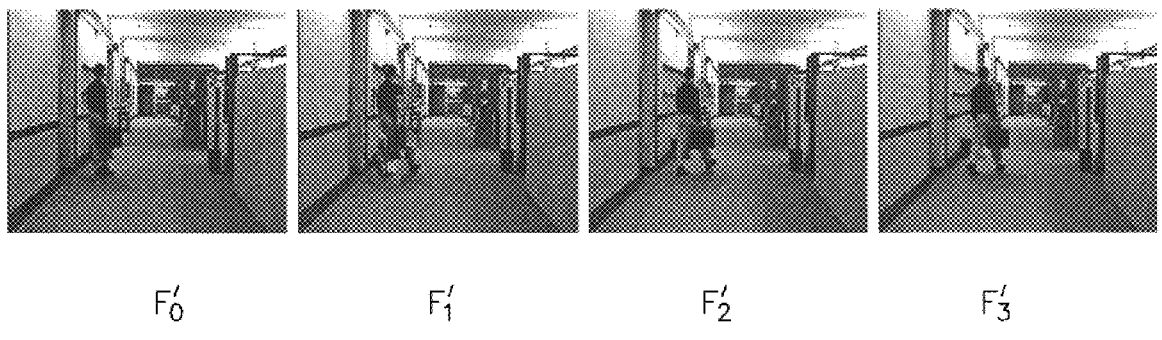
FIG. 3 is a computer-generated image of successive video frames illustrating the prevention of error propagation using RESCU.
Figure 4:
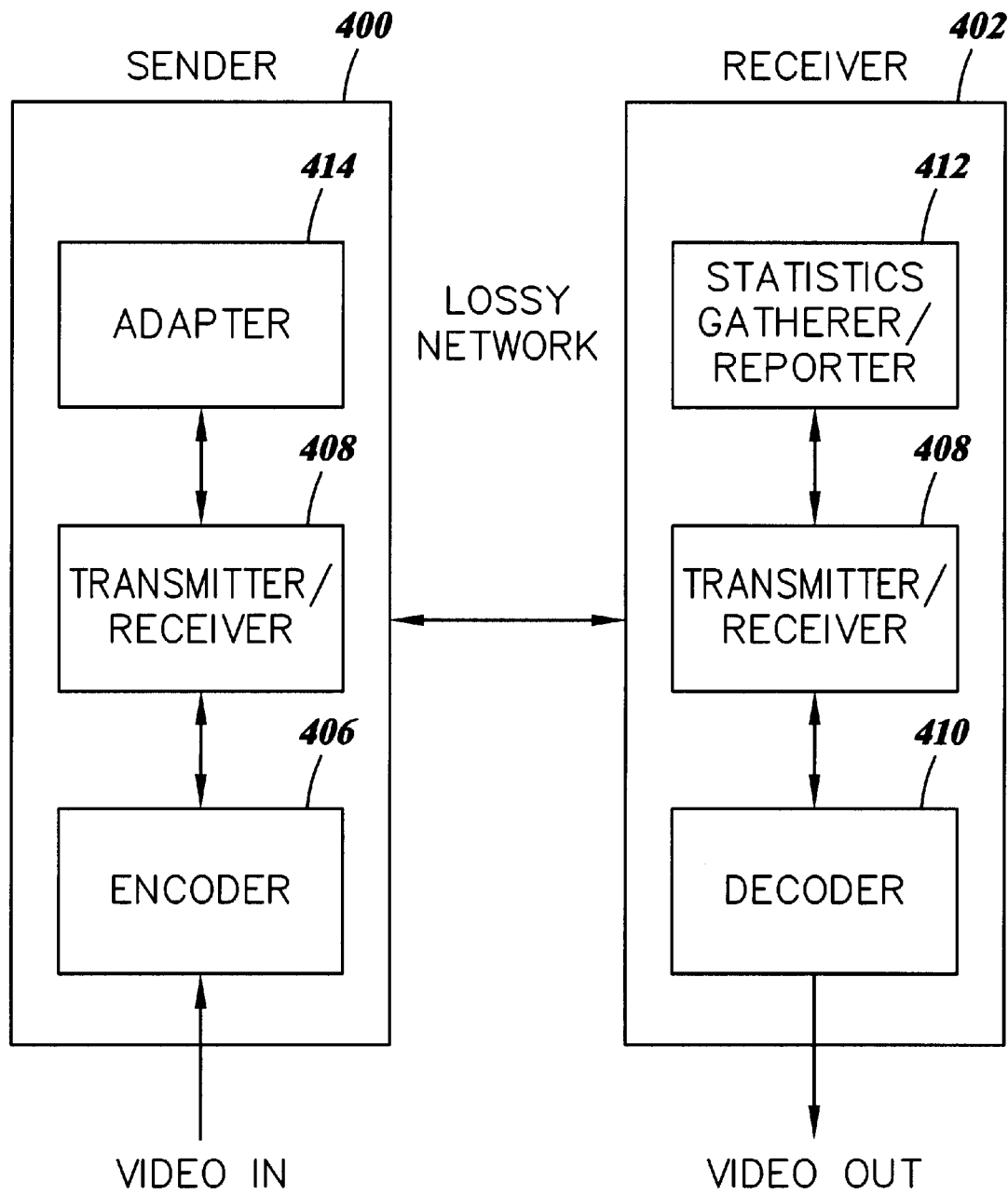
FIG. 4 is a block diagram of a system architecture on which embodiments of the present invention can reside.

FIG. 4 illustrates a system architecture on which the methods and systems for performing loss recovery according to the present invention can reside. In FIG. 4 a system includes a sender 400 and a receiver 402. Sender 400 and receiver 402 can each comprise a general-purpose computer, such as a personal computer or a workstation. The blocks illustrated in FIG. 4 within sender 400 and receiver 402 can comprise hardware, software, or a combination of hardware and software that performs lazy hybrid RESCU as described herein. Accordingly, embodiments of the invention can be implemented as computer-executable instructions embodied in a computer-readable medium for performing lazy hybrid RESCU as described herein.

Sender 400 and receiver 402 can communicate with each other over a lossy packet-based network, such as the Internet. In the illustrated embodiment, sender 400 includes a video encoder 406, a transmitter/receiver 408, and an adapter 400. Video encoder 406 is adapted to receive an incoming uncompressed video stream and encode the video stream using an appropriate encoding or compression technique. For example, video encoder 406 can implement H.261, H.263, MPEG-1, MPEG-2, MPEG-4, or other appropriate compression algorithm. Transmitter/receiver 408 packetizes the compressed video stream received from receiver 402 using an appropriate transport protocol, such as real time protocol/real time control protocol (RTP/RTCP).

Receiver 402 includes transmitter/receiver 408 capable of communicating with transmitter/receiver 408 of sender 400. Accordingly, transport module 402 may also implement a suitable transport protocol, such as RTP/RTCP. Receiver 402 also includes a video decoder 410 for receiving the compressed video stream from transmitter/receiver 408 and decompressing the video stream using an appropriate decompression algorithm. The decompression algorithm preferably corresponds to the compression algorithm used by video encoder 406. For example, the decompression algorithm can be implemented according to H.261, H.263, MPEG-1, MPEG-2, MPEG-4, or other suitable algorithm.

Receiver 402 can notify sender 400 of packet loss in any suitable manner. For example, receiver 402 can send a negative acknowledgment or a duplicate acknowledgement for each lost packet, including repair packets. In a preferred embodiment, receiver 402 sends negative acknowledgements for lost packets. The negative acknowledgments are preferably sent for periodic frames only. Since non-periodic frames are not used as reference frames, the loss of packets relating to non-periodic frames does not cause error propagation and hence require retransmission. Thus, non-periodic frames are preferably not recovered after their display time and therefore, explicit feedback regarding loss packets is not necessary. Accordingly, use of the feedback channel is reduced and more bandwidth is available for transmission.

According to an important aspect of the invention, receiver 402 includes statistics gatherer/reporter 412 for gathering statistics regarding packet loss and communicating these statistics to adapter 414 of sender 400. For example, statistics gatherer/reporter 412 can collect and/or calculate statistics on network parameters, such as the number of packets lost and the mean loss burst length. Since packets preferably have unique sequence numbers, packet losses can be detected by gaps in the sequence numbers of received packets. The mean loss burst length can be estimated by adding all of the instances of loss bursts, including a single loss, observed in an interval of 500 milliseconds and dividing the total by the number of burst loss instances, including single losses, in that same interval. The fraction of packets lost since the last interval can also be calculated.

Statistics gatherer/reporter 412 can periodically send receiver report packets containing the gathered statistical information to adapter 414. For example, a receiver report packet can be sent periodically, such as every 500 milliseconds. The receiver report packets can be formatted in any suitable format for communicating traffic statistics to the sender. In a preferred embodiment, the receiver report packets can be formatted according to the real time control protocol (RTCP). The mean loss burst length can be added in an application-specific extension field of an RTCP report packet.

Adapter 414 receives the receiver report packets and adjusts the PTDD period using one of the PTDD algorithms described below. If the loss recovery scheme uses FEC, then adapter 414 must also compute the number of FEC repair packets to be transmitted during that PTDD period. This information is passed to transmitter/receiver 408 of sender 400, which encodes the FEC repair packets in the periodic frame and interleaves the FEC packets with other data packets, i.e., packets of non-periodic frames, being transmitted over that PTDD period. Thus, because the PTDD period is adjusted dynamically in response to network conditions, error propagation is reduced and compression efficiency is increased over static PTDD retransmission schemes.

Retransmission-Based RESCU

In order to fully explain the methods and systems for dynamically updating the PTDD period according to embodiments of the present invention, retransmission-based and FEC-based RESCU must first be described. Retransmission is the most commonly used error recovery technique in reliable transport. However, due to the delay in detecting and retransmitting lost packets, retransmission is of less utility for real time video transmission.

Conventional techniques suggest the extension of frame playout time to allow for the additional time required for repair using retransmission. However, playout delay severely hinders interactive video communication. In contrast, retransmission-based RESCU accommodates the retransmission delays without introducing additional playout delays by allowing packets to be repaired within a PTDD period.

Figure 5:
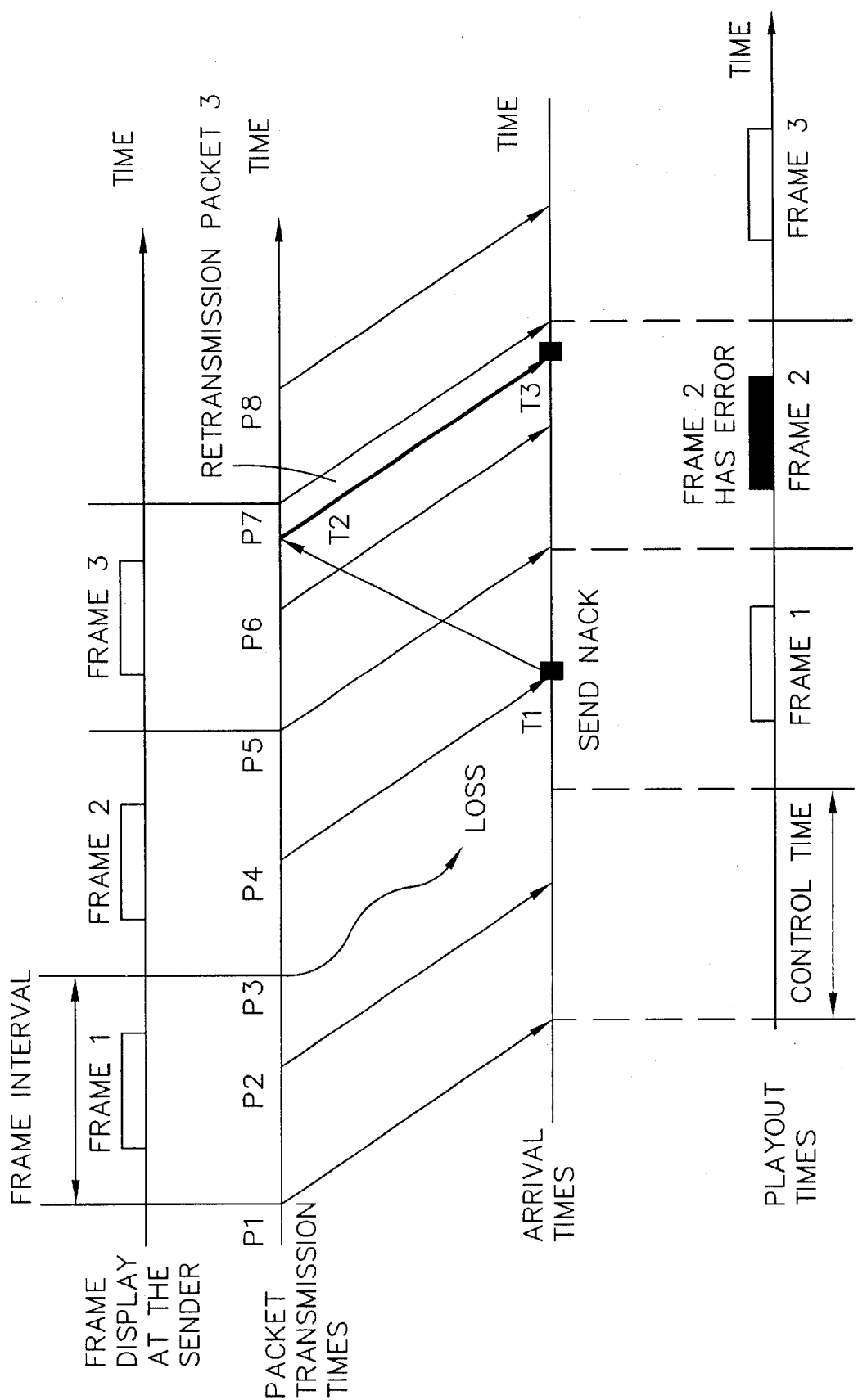
FIG. 5 is a block diagram illustrating error recovery using RESCU.

FIG. 5 illustrates error recovery using retransmission-based RESCU. In FIG. 5, the upper two horizontal lines represent the timing of events that occur at the sender. The lower two horizontal lines represent the timing of events that occur at the receiver. Referring to the uppermost horizontal line, three frames are transmitted from the sender to the receiver. A frame interval is defined as the time required to transmit all of the packets for one frame. The second horizontal line represents the packets transmitted for each frame. In the illustrated example, three packets are transmitted for each frame. For example, packets p1, p2, and p3 are transmitted for frame 1.

The arrows between the horizontal line labeled "packet transmission time" and the horizontal line labeled "arrival time" represent the transmission of packets over a lossy network. The curved line indicates that packet p3 is lost in transit between the sender and the receiver. However, the receiver receives packet p4 at time t1. Because the receiver receives packet p4 without receiving packet p3, the receiver knows that a loss has occurred. Accordingly, at time t1, the receiver sends a negative acknowledgment (NACK) to the sender. The sender receives the negative acknowledgment at time t2 and retransmits packet p3. Packet p3 arrives at the receiver at time t3. The retransmitted packet p3 is used to repair frame 1 stored in a frame buffer at the receiver. In this example, the PTDD value is set to two frame intervals. Accordingly, frame 1 is a reference frame for frame 3. Since frame 1 is repaired before it is used to decode frame 3, frame 3 can be displayed without error.

The main disadvantage of retransmission-based RESCU is that a long round-trip time can prolong error propagation. Since lost packets require at least one round-trip time for recovery, errors can propagate to at least the next RTT/$\delta_f$ frames, where RTT is the round trip time and $\delta_f$ is the frame interval.

FEC-Based RESCU

FEC is an alternative scheme for error recovery suitable for use in network environments in which frequent feedback is not feasible, such as mobile networks and satellite networks. Since FEC is an open-loop recovery scheme, its associated recovery delay can be significantly less than the recovery delay for retransmission. An exemplary FEC-based coding scheme suitable for use with embodiments of the present invention is linear block coding (LBC). In linear block coding, k source packets $d_1, d_2, \ldots d_k$ are encoded into n packets. In other words, FEC requires an additional n-k FEC packets to be included in a data stream. The n packets constitute a block. The LBC decoder at the receiver can reconstruct the original k data packets using any k packets from the n packet block. Efficient (n,k) LBC encoding and decoding algorithms have been developed and implemented to achieve real time performance. For example, one software coder can achieve a throughput of 11 MB/s on a 133 MHz Pentium® Processor available from Intel Corporation.

Even though FEC can be used to recover from packet losses, FEC is not effective when the losses of the original data packets and the losses of FEC repair packets are correlated. Using FEC in combination with RESCU alleviates this problem by allowing the FEC repair packets of a periodic frame to be dispersed over the PTDD period. FEC packets can be spaced apart so that FEC and data packet losses are not correlated to each other, thus reducing the effect of bursty losses. In addition, the FEC repair packets of a block can be sent Δ time units after the data packets, where Δ can be set to any suitable time period, such as one frame interval.

Figure 6:
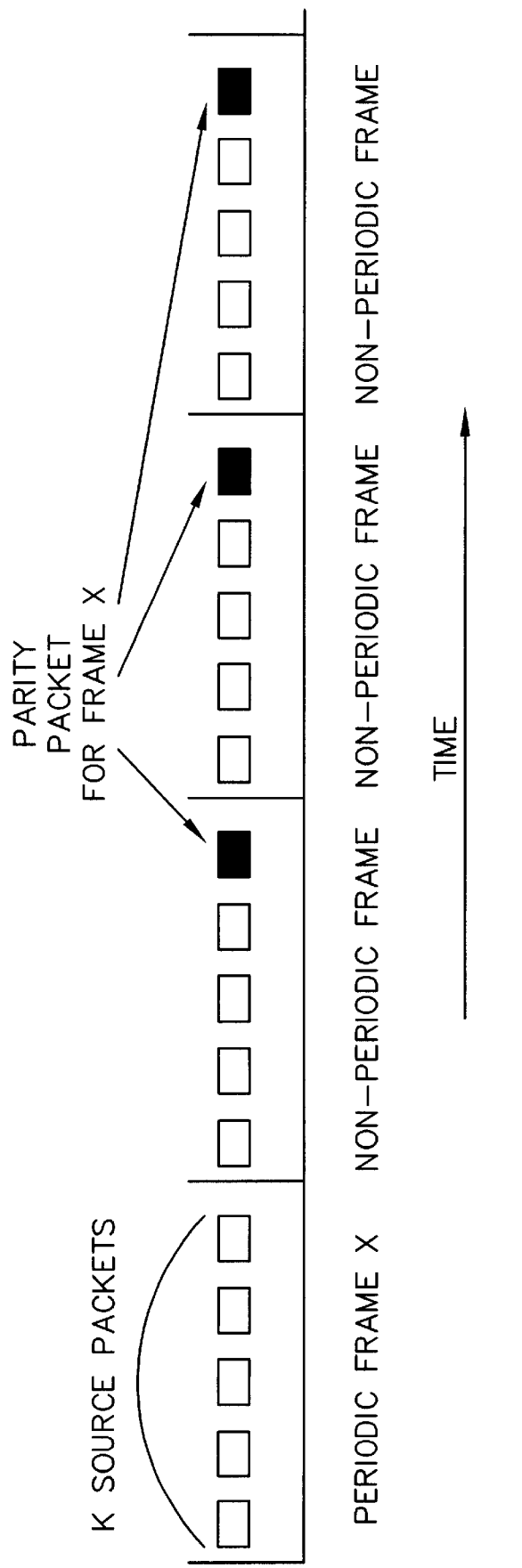
FIG. 6 is a block diagram illustrating error recovery using RESCU with forward error correction.

FIG. 6 illustrates a packet sequence using RESCU in which FEC packets are transmitted after the data packets of the frame to which the FEC packets apply but within the PTDD period. For example, in FIG. 6, periodic frame z is transmitted first and contains five data packets. FEC packets indicated by the shaded blocks are transmitted after transmission of the data packets for frame z but within the PTDD period. More particularly, the FEC packets are transmitted during each frame interval within the PTDD period. That is, Δ, the distance between FEC packets is set to one frame interval, $\delta_f$.

Although FEC-based RESCU is effective, one of the disadvantages of FEC is that it incurs bit overhead regardless of packet losses. For example, because FEC packets are transmitted proactively, overhead for transmitting the FEC packets is incurred even when no errors occur. Therefore, bandwidth is wasted during error-free transmission. As indicated above, because retransmission only occurs in response to an error, bandwidth is not wasted during error-free transmission. Accordingly, embodiments of the present invention utilize a hybrid scheme including both FEC- and retransmission-based recovery.

Dynamic PTDD Adjustment Protocol

Retransmission is necessary only when actual packet losses in a periodic frame indicate that it is not possible to recover the periodic frame using FEC packets alone. Thus, a hybrid scheme using retransmission and FEC can be reactive in nature. However, the PTDD must be set large enough to accommodate retransmission delays prior to retransmission. Unfortunately, it is difficult to predict when retransmission will occur. If the PTDD is set sufficiently large to handle rarely occurring transmission, then bit overhead due to an increased PTDD will be incurred regardless of whether retransmission occurs, wasting bandwidth during normal transmission. In order to solve this problem, embodiments of the present invention adjust the PTDD dynamically in response to a retransmission request, as will be discussed in more detail below.

Retransmission is most effective when applied in a truly reactive fashion, where retransmission overhead is incurred only at the time of retransmission. In lazy RESCU according to embodiments of the present invention, the PTDD is adjusted for retransmission only when retransmission occurs. During normal transmission, only a minimal amount of proactive redundancy due to FEC packets is added. Accordingly, lazy RESCU according to embodiments of the present invention achieves advantages associated with both FEC-based and retransmission-based error recovery.

The protocol for dynamically adjusting the PTDD period according to embodiments of the present invention can execute on the system architecture described above with respect to FIG. 4. For example, the protocol can be implemented by software included in adapter 414 of sender 400 illustrated in FIG. 4. Before transmitting a periodic frame $F_i$, adapter 414 determines the number of FEC packets, $f_i$ and a time interval between two FEC packets, Δ, required for recovering that periodic frame. Adapter 414 sets the next PTDD period to $$\left\lceil \frac{f_i \Delta + \delta_f}{\delta_f} \right\rceil$$

where $f_i$ is the number of FEC packets, Δ is the distance between FEC packets, and $\delta_f$ is the frame interval.

Adapter 414 sets $f_i$ and Δ to account for short burst losses for which FEC is most effective. Methods for determining $f_i$ and Δ will be discussed in more detail below. Thus, during normal transmission, the PTDD is set to a sufficiently small value to handle FEC recovery, i.e., short burst recovery.

In lazy RESCU according to embodiments of the present invention, retransmission occurs only when the sender learns through feedback from the receiver that ensuing FEC packets are not sufficient to recover lost packets for particular frame. The failure to recover a sufficient number of packets will most likely be caused by long burst losses. However, since the PTDD is short, retransmitted packets may not arrive before the decoding and display of the next scheduled periodic frame. Thus, the sender needs to make an adjustment to the PTDD before retransmission.

The main idea of lazy RESCU according to the present embodiment is that when transmission occurs for an already transmitted periodic frame $F_i$, the next frame $F_j$ encoded after that retransmission uses $F_i$ as its reference frame instead of the immediately preceding periodic frame $F_k$, and $F_j$ becomes the new periodic frame.

Figure 7:
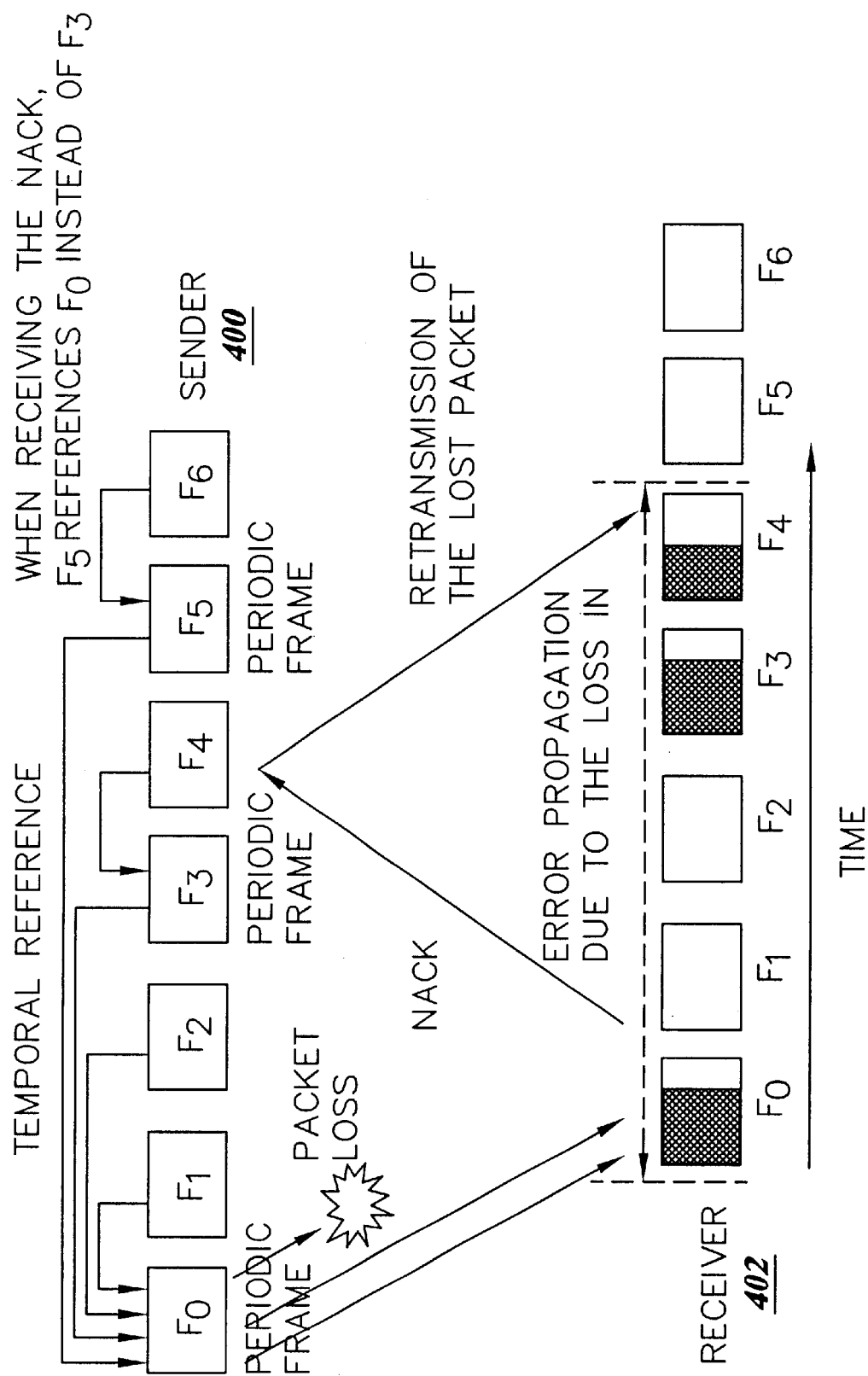
FIG. 7 is a block diagram illustrating methods and systems for performing lazy hybrid RESCU according to an embodiment of the present invention.

FIG. 7 illustrates the adjustment of the PTDD by adapter 414 of sender 400. In FIG. 7, frames $F_0$–$F_6$ are transmitted from sender 400 to receiver 402. $F_0$, $F_3$, and $F_5$ are periodic frames. $F_1$, $F_2$, $F_4$, and $F_6$ are non-periodic frames. Thus, initially, periodic frame $F_3$ temporally references periodic frame $F_0$ and periodic frame $F_5$ references periodic frame $F_3$.

In the example, a packet loss occurs in the transmission of periodic frame $F_0$. Before the display time of frame $F_5$ at receiver 402, receiver 402 requests and receives lost packets from periodic frame $F_0$. Upon receiving the retransmission request from receiver 402, sender 400 adjusts the PTDD for $F_5$ so that $F_5$ temporally references frame $F_0$ instead of frame $F_3$. Sender 400 then sends $F_5$ to the receiver. Receiver 402 decodes frame $F_5$ using repaired frame $F_0$ stored in the frame buffer. Accordingly, error propagation that occurred from frames $F_0$–$F_4$ does not continue to frame $F_5$.

If the time difference between $F_i$ and $F_j$ becomes too large, then temporal redundancy between the two frames is minimal. This decreases compression efficiency. As a result, a limit is preferably set on the time difference for using motion compensated coding. This time difference, referred to herein as $PTDD_{max}$, can be set to any suitable value, such as one second. If the difference is larger than this time limit, then $F_j$ is intra-coded.

The transmitter maintains a counter $c_i$ for each periodic frame $F_i$ to record the number of NACKs received for $F_i$. Retransmission of lost data packets of $F_i$ occurs only when all of the following conditions are met: (1) $c_i$ is greater than $f_i$, the number of FEC packets transmitted for the frame, (2) $F_i$ was transmitted less than $PTDD_{max}$, the maximum temporal dependency distance earlier, and (3) if $F_{intra}$ is the intra-frame or non-periodic sent most recently, $F_i$ was transmitted after $F_{intra}$ and no packets of periodic frames sent between $F_{intra}$ and $F_i$ are retransmitted.

In this scheme, since the periodic frames to be referenced are determined by feedback from the receiver, the encoder must store all the periodic frames transmitted within the maximum PTDD period allowed by the system ($ptdd_{max}$). Since feedback can be lost, the decoder at receiver 402 must store any damaged periodic frames received within the $ptdd_{max}$ period.

Computing $f_i$ and $\Delta$

The number of FEC packets $f_i$ transmitted for a given frame and the distance $\Delta$ between FEC packets are computed based on the latest "short-burst" loss characteristics. The short-burst loss characteristics are defined to be the mean loss rate and mean burst length of packet losses that appear in a loss burst involving less than 4 consecutive packet losses. The mean loss rate and burst length are computed using a weighted moving average of the sampled data. The reason for using only short-burst characteristics for computing $f_i$ and $\Delta$ is because FEC is effective only when packet losses are uncorrelated. When packet losses occur in long bursts, retransmission can be a more effective recovery method. Since it is difficult to predict when long burst losses can occur, the use of FEC to protect against such long burst losses is ineffective as it incurs unnecessarily high bit overhead during a quiescent period.

Using the short-burst loss characteristics, $\Delta$ can be computed as described above. $f_i$ is computed according to the following algorithm. For illustration, it is assumed that the periodic frame $F_i$ consists of k data packets. The sender adds $f_i$ FEC packets such that the number of packets expected to be received at the receiver, $EX(k,f_i)$, is at least equal to k (so that recovery is possible through FEC alone). When $f_i$ FEC packets are added to protect k packets of the periodic frame, the expected number of packets received is computed as follows:

$$EX(k, f_i) = \sum_{i=0}^{k} \{i \times D(k, i)\} + \sum_{j=0}^{f_i} \{j \times P(f_i, j)\}$$

$P(f_{i,j})$ denotes the probability of receiving exactly j packets out of $f_i$ FEC packets, whose losses are assumed to be uncorrelated. $P(f_{i,j})$ can be computed using a (1-state) Bernoulli model as $$P(f_{i,j}) = C_j^{f_i}(1-p)^j(p)^{f_i-j}$$

By adding just enough FEC to protect against expected losses, unnecessary FEC overhead is minimized. In addition, most losses are likely to be repaired by FEC alone. When the estimate of FEC packets is not sufficient to recover lost packets, retransmission can be used to augment FEC in the recovery process.

Experimental Results

Loss recovery schemes disclosed herein improve video quality under lossy Internet environments by focusing on removing error propagation associated with motion-compensated video coding. To evaluate the effectiveness of these schemes, performance of these schemes is measured under varying network conditions produced by actual Internet traces. The performance is then compared to the performance of existing solutions, such as RPS and Intra-H.261, which address the error propagation problem. In the performance evaluation, three H.263 anchor video sequences produced by an H.263 codec available from Telenor, one for each of MPEG-4 class A, B and E tests, are compared. The three video sequences are described in Table 1.

TABLE 1

Test Video Sequences

| Video Sequence | Class | Description |
| --- | --- | --- |
| container | A | Low spatial detail and low amount of motion |
| News | B | Medium spatial detail and medium amount of motion |
| Children | C | Hybrid natural and synthetic movements |

TABLE 2

Bit rates per frame of RESCU as PTDD increases using container video sequence

| PTDD | 1(bits/f) | 2(%) | 3(%) | 4(%) | 5(%) | 6(%) | 7(%) | 8(%) | 9(%) | 10(%) |
| --- | --- | --- | --- | --- | --- | --- | --- | --- | --- | --- |
| RESCU + H.261 | 18880 | 6 | 10 | 14 | 18 | 20 | 23 | 26 | 29 | 32 |
| Periodic frame | 18880 | 12 | 28 | 32 | 49 | 50 | 64 | 67 | 79 | 81 |

TABLE 2-continued

Bit rates per frame of RESCU as PTDD increases using container video sequence

| PTDD | 1(bits/f) | 2(%) | 3(%) | 4(%) | 5(%) | 6(%) | 7(%) | 8(%) | 9(%) | 10(%) |
|---|---|---|---|---|---|---|---|---|---|---|
| Intra frame | 88360 | N/A | N/A | N/A | N/A | N/A | N/A | N/A | N/A | N/A |

TABLE 3

Bit rates per frame of RESCU as PTDD increases using news video sequence

| PTDD | 1(bits/f) | 2(%) | 3(%) | 4(%) | 5(%) | 6(%) | 7(%) | 8(%) | 9(%) | 10(%) |
|---|---|---|---|---|---|---|---|---|---|---|
| RESCU + H.261 | 19344 | 10 | 19 | 26 | 33 | 36 | 42 | 46 | 52 | 52 |
| Periodic frame | 19344 | 26 | 47 | 61 | 76 | 85 | 96 | 103 | 110 | 119 |
| Intra frame | 90760 | N/A | N/A | N/A | N/A | N/A | N/A | N/A | N/A | N/A |

TABLE 4

Bit rates per frame of RESCU as PTDD increases using children video sequence

| PTDD | 1(bits/f) | 2(%) | 3(%) | 4(%) | 5(%) | 6(%) | 7(%) | 8(%) | 9(%) | 10(%) |
|---|---|---|---|---|---|---|---|---|---|---|
| RESCU + H.261 | 34856 | 12 | 20 | 26 | 30 | 38 | 37 | 42 | 50 | 52 |
| Periodic frame | 34856 | 25 | 41 | 51 | 5& | 70 | 75 | 81 | 90 | 93 |
| Intra frame | 111600 | N/A | N/A | N/A | N/A | N/A | N/A | N/A | N/A | N/A |

TABLE 5

Average statistics for 10 different transmission traces

| No. | Avg. Packet Loss Rate (%) | Avg. RTT (ms) |
|---|---|---|
| 1 | 0.5 | 245 |
| 2 | 5.03 | 268 |
| 3 | 8.20 | 255 |
| 4 | 8.41 | 261 |
| 5 | 8.91 | 355 |
| 6 | 12.23 | 313 |
| 7 | 13.84 | 276 |
| 8 | 14.04 | 800 |
| 9 | 15.35 | 572 |
| 10 | 17.45 | 976 |

Compression Efficiency of RESCU

Tables 2, 3, and 4 show the percentage increase of average bit rate per frame or each video sequence as PTDD increases when RESCU is combined with H.261 (RESCU+H.261). When PTDD is set to one, the average bit rates of RESCU+H.261 are the same as the average bit rate of H.261. The tables also show the average bit rate increase of periodic frames in RESCU+H.261 (denoted "Periodic frame" in the tables), and the average bit rate when every frame was intra-coded (denoted "Intra frame" in the tables). The results indicate that for each increment of PTDD, the compression efficiency of RESCU drops about 3% to 5% in the container video sequence, and about 2% to 12% in the news and children video sequence. From the tables, it can be seen that when more motion is present, the bit overhead of RESCU increases. The results discussed below with regard to trace simulations illustrate that RESCU achieves the best quality and bit rate tradeoffs compared to all the techniques tested. In addition, since the bit overhead of periodic frames is much less than I-frames, exploiting temporal redundancy between two periodic frames rather than coding the periodic frames as I-frames is advantageous.

Simulation Setup Internet Transmission

To emulate the loss behavior encountered in the Internet, 12 minute video transmissions were collected over a transpacific connection every hour for a two-week period. The frame rate was set to 10 frames per second. Full-search motion estimation and the image size of CIF (352×288 color) were used for all experiments. The default quantization step of 8 was used. A video frame was first compressed using a RESCU codec, which was built using an implementation of H.261. The video frame was then packetized into approximately 256-byte packets, such that the individual packets contain an integral number of macroblocks.

A wide range of round-trip times (RTT) (from about 250 ms to over 1000 ms), and loss rates (from 0.5% to 18%) were observed. The mean loss burst length is less than 3. Most of loss bursts are short. Occasionally, long loss bursts involving more than 100 packets are also seen. Out of about 200 traces obtained, 10 representative traces covering a spectrum of (mean) loss rate and round trip time were selected. Table 5 summarizes the average traffic characteristics observed in the selected transmission traces.

Trace-Driven Simulation

The profile information of each trace, which consists of statistics on the loss rate, round-trip delays, and the instances of loss bursts of lengths from 1 to over 200 observed for every non-overlapping 10 second segment was extracted. Each trace yields 72 pieces of profile information to form one error model for a transmission simulation experiment. Each error model is applied to construct a UCB/VINT network simulator (ns) setup. In the simulator, an error model obtained from a trace controls transmission latency and the number of packets being dropped for a simulated 10-second period to follow the profile information of the corresponding 10-second period in that trace.

Figure 8:
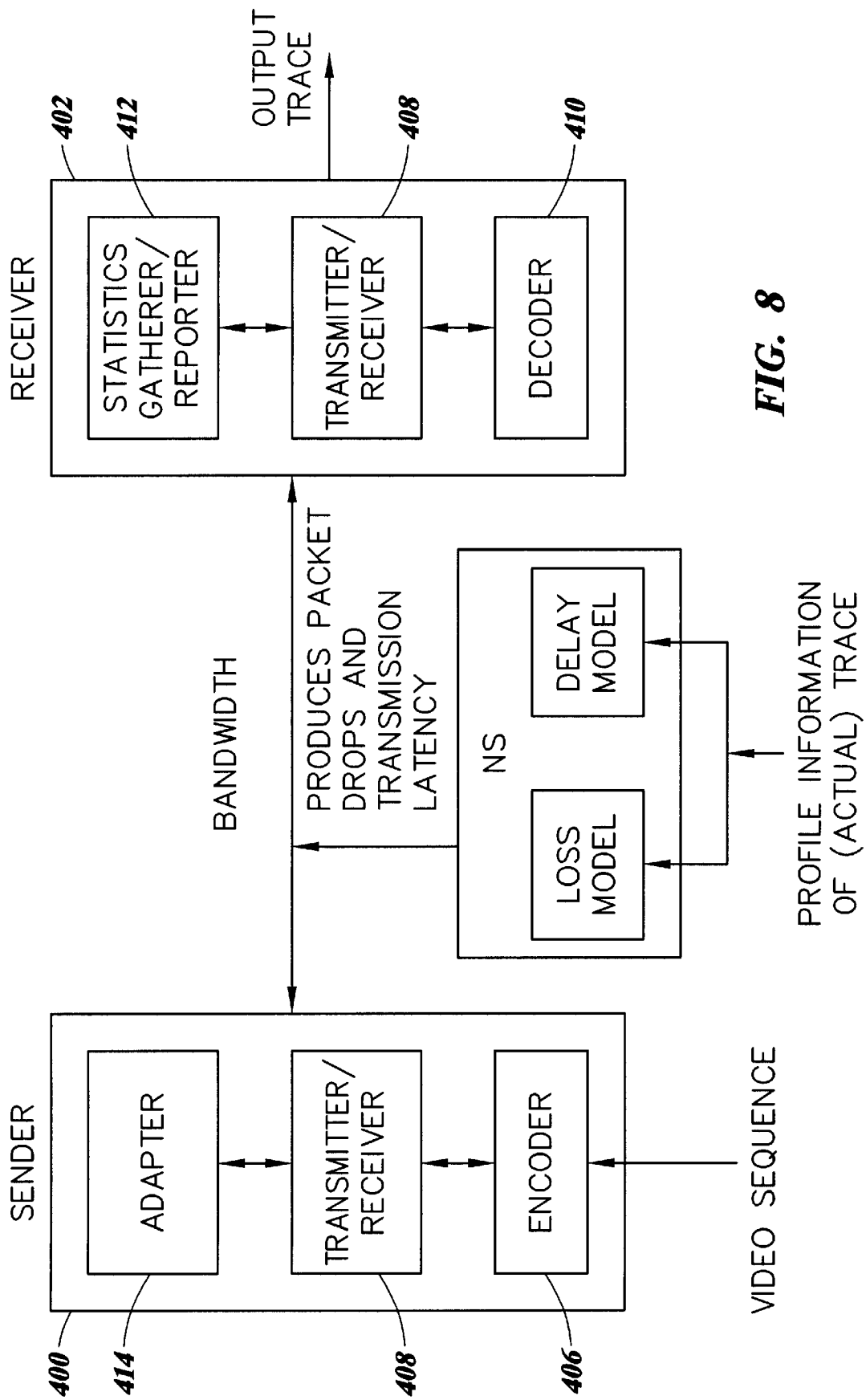
FIG. 8 is a block diagram illustrating a system for evaluating the performance of lazy hybrid RESCU and other algorithms according to an embodiment of the present invention.

Video codecs (RPS, RESCU and Intra-H.261) built by modifying an implementation of H.261, and the error models of the selected traces are integrated with UCB/VINT network simulator ns. FIG. 8 illustrates the simulation setup which implements the system architecture described above. In FIG. 8, transmitter 408 of sender 400 packetizes compressed video frames and passes the packetized sequence to network simulator ns to produce packet drops and transmission latency. At the receiving end, a trace is generated which records all the received packets and their received time. The output trace is analyzed to measure the end video quality using an off-line decoder. Simulation was conducted in 10 ns runs, each with a different error model.

Results of Performance Comparison

In this section, the results of performance comparison of hybrid RESCU, FEC, RETX, RPS, H.261, and Intra-H.261 are reported. Since the performance of Intra-H2.61 depends on the available bandwidth, the performance of lntra-H.261 is tested at a bandwidth matching approximately the maximum bandwidth used by any of the dynamic hybrid RESCU schemes. Results of the comparison are presented in the following order for each video sequence.

Comparison of the performance of lazy hybrid RESCU (lazy) with that of FEC-only RESCU (FEC) and, retransmission-only RESCU (RETX).

Comparison of performance of lazy with that of exhaustive hybrid RESCU (exhaustive).

Comparison of the performance of lazy with that of lntra-H.261, RPS, and H.261.

In the next section, the results for the three video sequences mentioned and observations are discussed in detail.

Comparison with Other Techniques

Figures 9, 10:
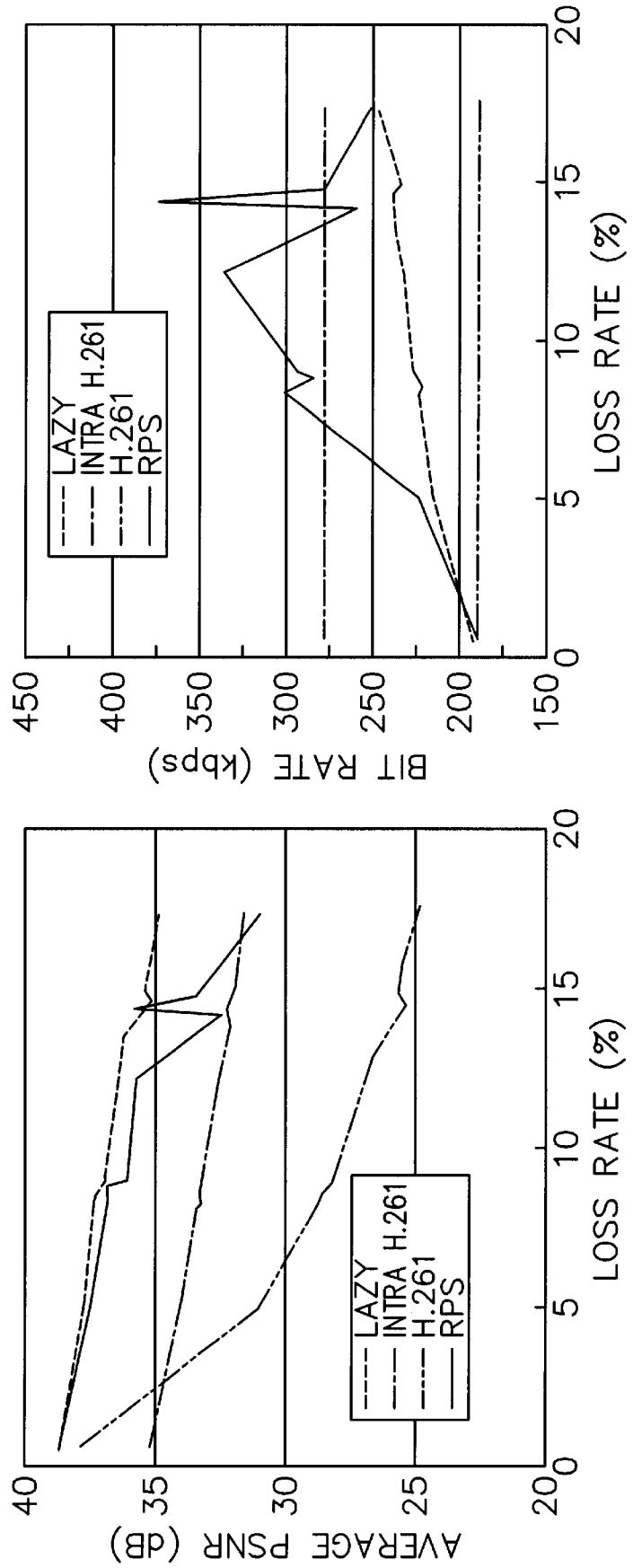
FIG. 9 is a graph of average PSNR versus percentage loss rate under lazy hybrid RESCU, H.261, lntra-H.261, and RPS for a video sequence entitled "container"
FIG. 10 is a graph of bit rate versus percentage loss rate under lazy hybrid RESCU, H.261, lntra-H.261, and RPS for the video sequence entitled "container"

FIGS. 9 and 10 show the average PSNR and bit rate at different loss rates under H.261, RPS, Intra-H.261 and lazy RESCU according to embodiments of the present invention for the container video sequence. As illustrated in FIG. 9, the average PSNR of H.261 falls rapidly (to as much as 12 dB lower) as loss rate increases because of error propagation. Even at the lowest loss rate, the lower quality of Intra-H.261 for this loss rate is because for a target bit rate there is a limit on the maximum video quality it can sustain, its average PSNR is lower than that under RPS and lazy. This shows that even a few packet losses can affect H.261. intra-H.261 shows a linear degradation in quality as loss rate increases with significantly higher bit rate than those of other schemes. RPS on the other hand can quickly recover from packet losses when RTT is small enough. However, at higher loss rates, only a small number of frames are received correctly and only the correctly received frames are used as reference frames. Even in low motion video sequences, such as the container sequence, motion-prediction is effective only up to a certain time after that frame. This is the reason for high bit rate RPS at high loss rates and small RTT. When the RTT is long, RPS shows poorer error resilience resulting in its average PSNR up to 4 dB lower than that of lazy RESCU. Lazy RESCU consistently gives better average PSNR than the other three schemes and lower bit rates than RPS and Intra-H.261.

Figure 12:
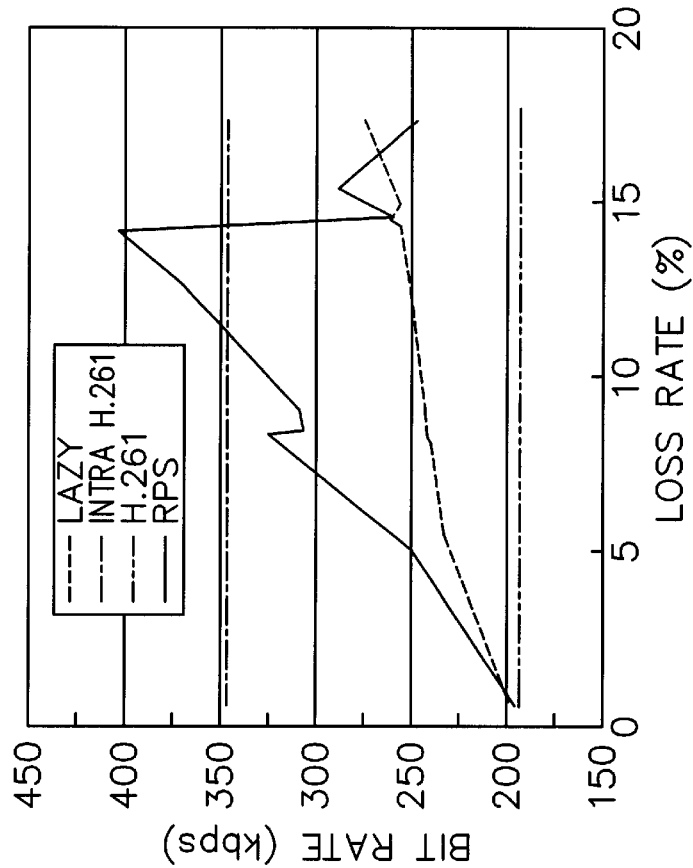
FIG. 12 is a graph of bit rate versus percentage loss rate under lazy hybrid RESCU, H.261, lntra-H.261, and RPS for a video sequence entitled "news"
Figure 11:
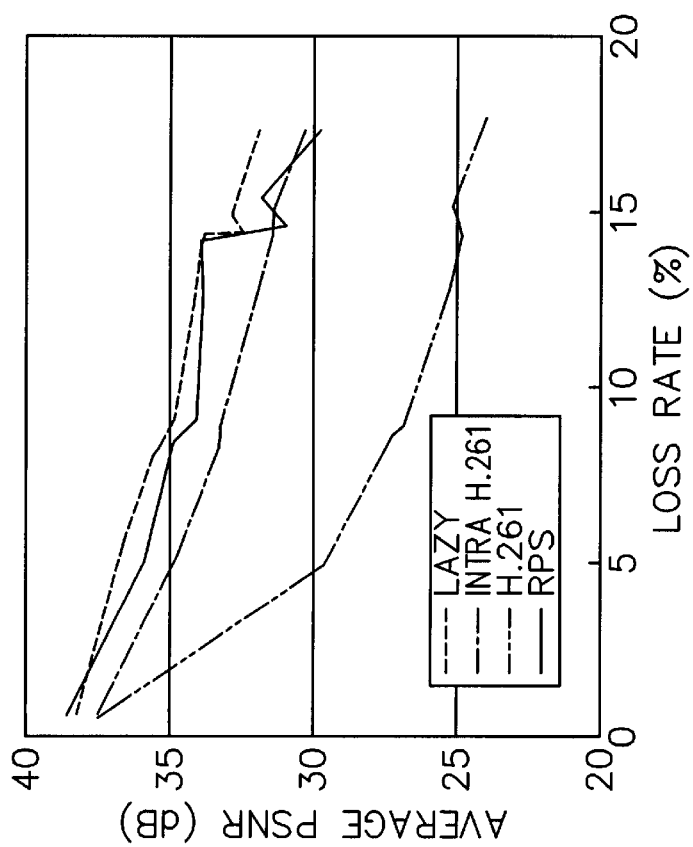
FIG. 11 is a graph of average PSNR versus percentage loss rate under lazy hybrid RESCU, H.261, Intra-H.261, and RPS for a video sequence entitled "news"

FIGS. 11 and 12 illustrate the performance of H.261, RPS, Intra-H.261 and lazy RESCU. Lazy RESCU shows better average PSNR than all the other schemes. The average PSNR of H.261 decreases rapidly as the loss rate increases. Lazy RESCU shows up to 2 dB higher PSNR than that under RPS, but the bit rate is much lower in all but the instances with high RTT. Intra-H.261 shows 2–3 dB lower PSNR in spite of 35%–40% higher bit rate. The bit rate of lazy and RPS in news has increased quite a bit (about 10%) from that in the container sequence. This is because these techniques allow the time distance between a frame and its temporally dependent frame to be larger than one frame interval, and thus more motion present in the input video sequence significantly reduces compression efficiency. However, for video sequences with a medium degree of motion such as news, lazy RESCU still maintains the highest video quality with only a small amount of bit overhead even under high loss rates.

Figure 14:
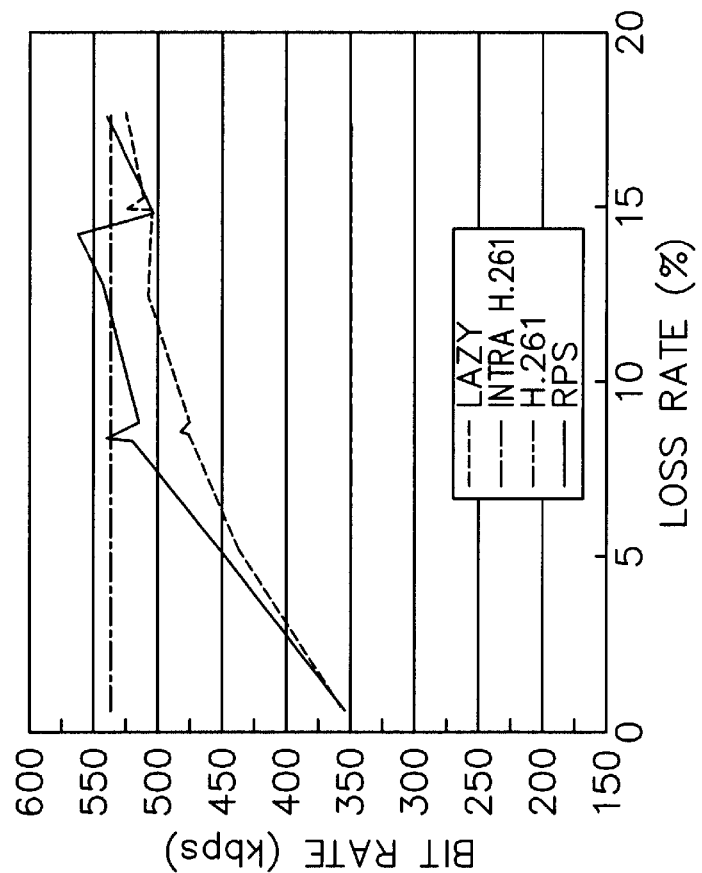
FIG. 14 is a graph of bit rate versus percentage loss rate under lazy hybrid RESCU, H.261, Intra-H.261, and RPS for a video sequence entitled "children"
Figure 13:
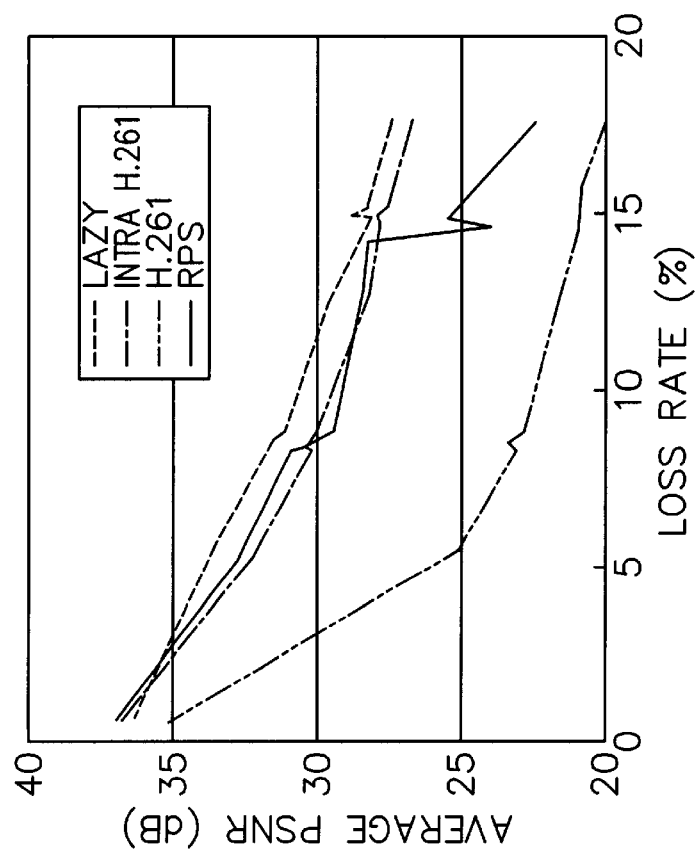
FIG. 13 is a graph of average PSNR versus percentage loss rate under lazy hybrid RESCU, H.261, Intra-H.261, and RPS for a video sequence entitled "children"

FIGS. 13 and 14 show the performance of H.261, RPS, Intra-H.261, and lazy RESCU for the children video sequence. As expected, the average PSNR decreases rapidly in H.261 as the loss rate increases. Despite much steeper drop in video quality than in the news and container sequences, lazy RESCU still shows a better performance both in terms of the average PSNR and bit rate when compared to RPS and lntra-H.261.

Adaptiveness of Hybrid RESCU

Figure 15:
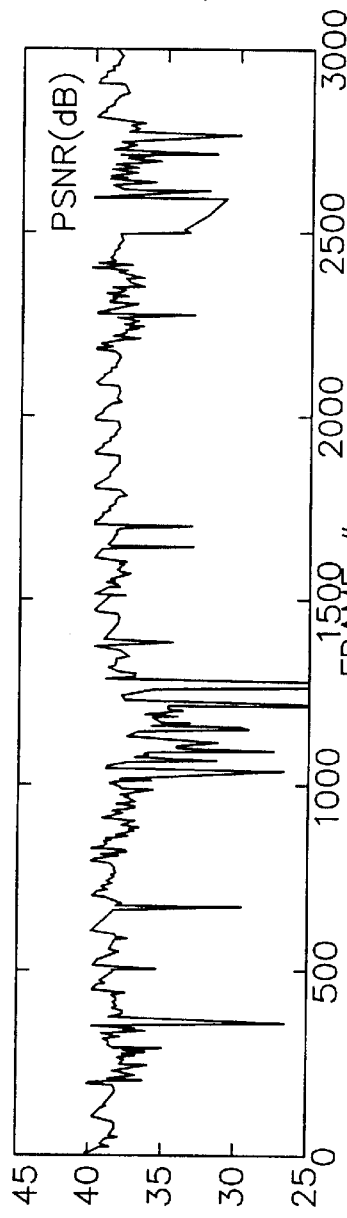
FIGS. 15–17 are graphs of percentage loss rate per frame illustrating the performance of lazy hybrid RESCU under varying network conditions.
Figure 16:
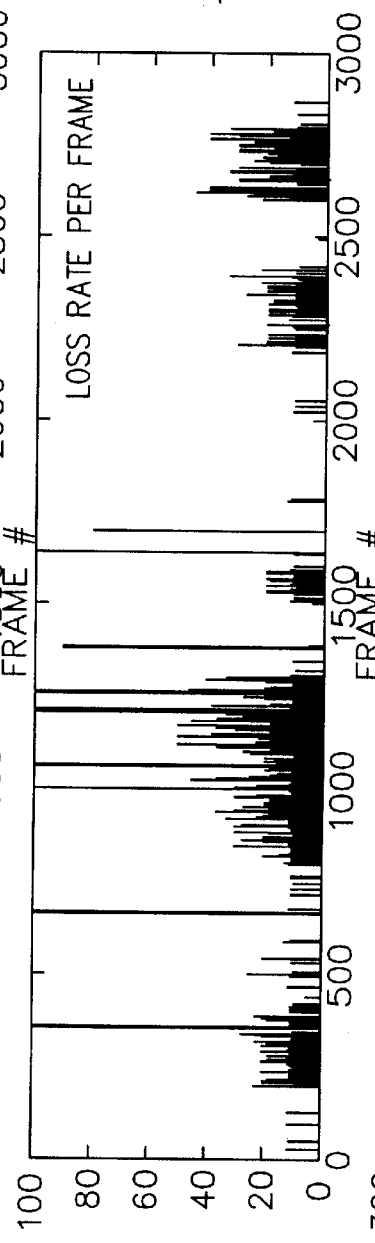
Figure 17:
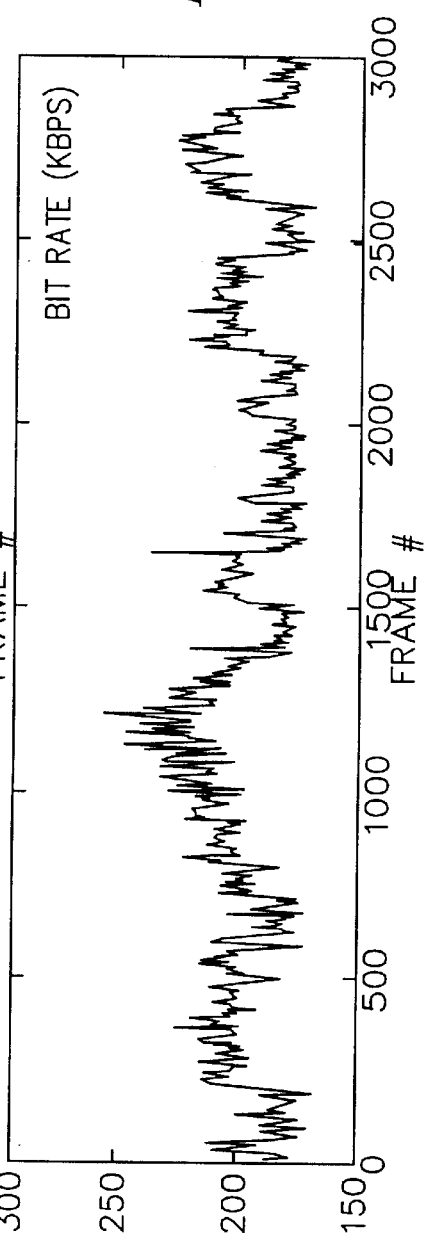

To illustrate the adaptiveness of lazy hybrid RESCU, the scheme is executed over a trace where network traffic shows high variations. In FIGS. 15–17, the results of the experiment performed using the container sequence are plotted. FIG. 15 shows the average PSNR over every 5-frame period (i.e., every half-second period), FIG. 16 shows the loss percentage of each frame, and FIG. 17 shows the average bit rate over every 5-frame period.

The adaptiveness of lazy hybrid RESCU is clearly visible when it adapts the amount of repair overhead to maintain high quality under varying network conditions. From the first graph, it can be observed that that the video quality of the RESCU scheme drops when packet loss occurs. However, the video quality immediately bounces back and generally sustains good quality with PSNRs between 35 dB and 40 dB. Around frames 200–450, frames 700–1350, frames 2200–2400, and frames 2600–2800, the trace experiences high packet losses. During these times, it can be observed that the bit rate increases beyond 225 kbits/sec, which is the result of increased repair traffic. During the other times, the bit rate drops to around 180 kbits/sec which is approximately the same bit rate as H.261. This is because during heavy loss periods, FEC packets are not enough to recover from losses, and retransmission is used more often. Since during quiescent periods, retransmission does not occur and only a small number of FEC packets are added, the bit overhead drops to minimum. These results combined with the results presented in the previous sections indicate that lazy RESCU is able to adapt to varying network conditions to minimize bit overhead while sustaining good video quality.

Increased bit rates during lossy congested period will only aggravate congestion. The intent of these experiments is to show the effect of recovery. In a practical scheme, any recovery scheme has to be combined with a congestion control mechanism. When combined with a congestion control mechanism, RESCU has to increase the ratio of repair traffic over data traffic. Since RESCU can achieve a very good balance between video quality and bit overhead, RESCU can be a recovery mechanism used with congestion control. However, the performance of RESCU under a congestion control mechanism requires further study.

Conclusion

Video transmission over lossy networks, such as the Internet, is challenging because the quality of compressed video is very susceptible to packet losses. A dynamic hybrid loss recovery scheme as described herein reduces error propagation due to packet loss in video transmission over the Internet. By carefully combining transport level recovery mechanisms such as FEC and retransmission, into a hybrid recovery scheme, the respective strengths can be utilized. Also, a dynamic recovery scheme that adapts itself to the network characteristics can not only improve the resilience to packet loss but can also reduce incurred bit overhead.

Two dynamic hybrid recovery schemes have been described herein: The first is exhaustive hybrid RESCU, in which the sender finds minimum PDTT that incurs smallest bit overhead, and also satisfies a desired recovery probability of a periodic frame. In order to be able to meet the desired threshold, the PTDD should be long enough to accommodate anticipated repair attempts and the associated delays due to both FEC and retransmission. The second is lazy hybrid RESCU, in which the sender chooses a PTDD that "proactively" provides only for recovery through FEC, and masks out retransmission delays in a truly "reactive" manner, if and when retransmission occurs, without introducing additional playout delays.

The simulations described herein designed based on actual Internet transmission tests illustrate that these dynamic hybrid recovery schemes provide better performance than existing error-resilient schemes, both in terms of video quality and bit rate. Even in a high motion video sequence when the performance gains of both the hybrid techniques is much attenuated, they nonetheless show better overall performance when compared to RPS and Intra-H.261.

The integration of rate control schemes for RESCU has not been investigated as it is outside of the primary scope of the embodiments described herein. RESCU can be extended to incorporate rate control schemes (e.g. frame rate reduction, quantization step-size adjustment etc.) that can reduce bit rate in times of packet losses so that congestion is not aggravated by increased overhead of protecting video frames.

It will be understood that various details of the invention may be changed without departing from the scope of the invention. Furthermore, the foregoing description is for the purpose of illustration only, and not for the purpose of limitation—the invention being defined by the claims.

What is claimed is:

1. A method for performing error recovery in a packetized video data stream transmitted over a lossy network, the method comprising:
    (a) encoding a plurality of frames of video data such that each frame depends temporally on a reference frame;
    (b) transmitting a first frame from a sender to a receiver;
    (c) after transmitting the first frame, transmitting forward error correction (FEC) packets for the first frame from the sender to the receiver;
    (d) at the receiver, detecting an error in the first frame, determining whether the error can be corrected using the FEC packets, and, in response to determining that the error cannot be corrected using the FEC packets, requesting retransmission of lost or erroneously received packets associated with the first frame; and
    (e) at the sender, receiving the retransmission request, and, in response:
        (e)(i) retransmitting the lost or erroneously received packets to the receiver;
        (e)(ii) changing the periodic temporal dependency distance of a second frame of the plurality of frames such that the second frame depends temporally on the first frame; and
        (e)(iii) encoding the second frame using the first frame as a reference frame and transmitting the second frame to the receiver.

2. The method of claim 1 wherein encoding the plurality of frames of video data includes encoding the frames according to the H.261 standard for video compression.

3. The method of claim 1 wherein encoding the plurality of frames of video data includes encoding the frames according to the H.263 standard for video compression.

4. The method of claim 1 wherein encoding the plurality of frames of video data includes encoding the frames according to the MPEG-1 standard for video compression.

5. The method of claim 1 wherein encoding the plurality of frames of video data includes encoding the frames according to the MPEG-2 standard for video compression.

6. The method of claim 1 wherein encoding the plurality of frames of video data includes encoding the frames according to the MPEG-4 standard for video compression.

7. The method of claim 1 comprising, at the receiver:
    (f) receiving the retransmitted packets;
    (g) reconstructing the first frame using the retransmitted packets;
    (h) receiving the second frame; and
    (i) decoding the second frame using the reconstructed first video frame as a reference frame.

8. The method of claim 7 comprising, at the receiver, displaying the first frame before receiving the retransmitted packets.

9. The method of claim 7 wherein decoding the second frame includes decoding the second frame according to the H.261 standard for video decompression.

10. The method of claim 7 wherein decoding the second frame includes decoding the second frame according to the H.263 standard for video decompression.

11. The method of claim 7 wherein decoding the second frame includes decoding the second frame according to the MPEG-1 standard for video decompression.

12. The method of claim 7 wherein decoding the second frame includes decoding the second frame according to the MPEG-2 standard for video decompression.

13. The method of claim 7 wherein decoding the second frame includes decoding the second frame according to the MPEG-4 standard for video decompression.

14. The method of claim 1 wherein the first and second frames comprise periodic frames.

15. The method of claim 14 comprising transmitting a plurality of non-periodic frames between the first and second frames.

16. A method for performing error recovery in a packetized video data stream transmitted over a lossy network, the method comprising:
    (a) encoding a plurality of periodic frames of video data such that each periodic frame depends temporally on an immediately preceding periodic frame;
    (b) transmitting a periodic frame $F_i$, i being an integer, from a sender to a receiver;
    (c) after transmitting the periodic frame $F_i$, transmitting forward error correction (FEC) packets for the periodic frame $F_i$ from the sender to the receiver;
    (d) at the receiver, detecting an error in the periodic frame $F_1$, determining whether the error can be corrected using the FEC packets, and, in response to determining that the error cannot be corrected using the FEC packets, requesting retransmission of lost or erroneously received packets associated with the frame $F_i$; and
    (e) at the sender, receiving the retransmission request, and, in response:

(e)(i) retransmitting the lost or erroneously received packets to the receiver;

(e)(ii) changing the periodic temporal dependency distance of a periodic frame $F_j$, j being an integer, such that the frame $F_j$ depends temporally on the frame $F_i$ rather than the immediately preceding periodic frame of $F_j$; and (e)(iii) encoding the frame $F_j$ using the periodic frame $F_i$ as a reference frame and transmitting the periodic frame $F_j$ to the receiver.

17. The method of claim 16 comprising:

(f) receiving the retransmitted packets;

(g) reconstructing the periodic frame $F_i$ using the retransmitted packets;

(h) receiving the periodic frame $F_j$; and (i) decoding the periodic frame $F_j$ using the reconstructed frame $F_i$ as a reference frame.

18. The method of claim 16 wherein requesting retransmission of the lost or erroneously received packets comprises transmitting a negative acknowledgment (NACK) from the sender to the receiver.

19. The method of claim 17 wherein decoding the periodic frame $F_j$ includes decoding the periodic frame $F_j$ according to the H.261 standard for video decompression.

20. The method of claim 17 wherein decoding the periodic frame $F_j$ includes decoding the periodic frame $F_j$ according to the H.263 standard for video decompression.

21. The method of claim 17 wherein decoding the periodic frame $F_j$ includes decoding the periodic frame $F_j$ according to the MPEG-1 standard for video decompression.

22. The method of claim 17 wherein decoding the periodic frame $F_j$ includes decoding the periodic frame $F_j$ according to the MPEG-2 standard for video decompression.

23. The method of claim 17 wherein decoding the periodic frame $F_j$ includes decoding the periodic frame $F_j$ according to the MPEG-4 standard for video decompression.

24. A method for performing error recovery when transmitting a compressed video data stream across a lossy packet-based network, the method comprising:

(a) transmitting a plurality of frames of compressed video data from a sender to a receiver;

at the sender:

(b) determining a number of forward error correction (FEC) packets for each frame;

(c) transmitting the forward error correction packets for each frame from the sender to the receiver;

(d) monitoring the number of negative acknowledgements received for each frame, and, in response to determining that the number of negative acknowledgements exceeds a predetermined value, retransmitting a packets corresponding to the negative acknowledgements;

at the receiver:

(e) receiving the retransmitted packets and restoring a frame in the frame buffer using the retransmitted packets; and (f) using the restored frame as a reference frame for a frame to be displayed.

25. The method of claim 24 comprising at the sender, setting a periodic temporal dependency (PTDD) value to an initial value sufficiently large to allow recovery of lost packets using the FEC packets.

26. The method of claim 25 comprising, in response to retransmitting the lost or erroneously received packets, setting the PTDD value to a value sufficiently large to allow recovery using the retransmitted packets.

27. A computer program product comprising computer-executable instructions embodied in a computer-readable medium for performing steps comprising:

(a) encoding a plurality of periodic frames of video data such that each periodic frame depends temporally on an immediately preceding periodic frame;

(b) transmitting a periodic frame $F_i$, i being an integer, from a sender to a receiver;

(c) after transmitting the periodic frame $F_i$, transmitting forward error correction (FEC) packets for the periodic frame $F_i$ from the sender to the receiver;

(d) at the receiver, detecting an error in the periodic frame $F_i$, determining whether the error can be repaired using the FEC packets, and, in response to determining that the error cannot be repaired using the FEC packets, requesting retransmission of lost or erroneously received packets associated with the frame $F_i$; and (e) at the sender, receiving the retransmission request, and, in response:

(e)(i) retransmitting the lost or erroneously received packets to the receiver;

(e)(ii) changing the periodic temporal dependency distance of a periodic frame $F_j$, j being an integer, such that the frame $F_j$ depends temporally on the frame $F_i$ rather than the immediately preceding periodic frame of $F_j$; and (e)(iii) encoding the frame $F_j$ using the periodic frame $F_i$ as a reference frame and transmitting the periodic frame $F_j$ to the receiver.

28. The computer program product of claim 27 comprising:

(f) receiving the retransmitted packets;

(g) reconstructing the periodic frame $F_i$ using the retransmitted packets;

(h) receiving the periodic frame $F_j$; and (i) decoding the periodic frame $F_j$ using the reconstructed frame $F_i$ as a reference frame.

29. The computer program product of claim 27 wherein requesting retransmission the lost or erroneously received packets comprises transmitting a negative acknowledgment (NACK) from the sender to the receiver.

30. The computer program product of claim 28 wherein decoding the periodic frame $F_j$ includes decoding the periodic frame $F_j$ according to the H.261 standard for video decompression.

31. The computer program product of claim 28 wherein decoding the periodic frame $F_j$ includes decoding the periodic frame $F_j$ according to the H.263 standard for video decompression.

32. The computer program product of claim 28 wherein decoding the periodic frame $F_j$ comprises decoding the periodic frame $F_j$ according to the MPEG-1 standard for video decompression.

33. The computer program product of claim 28 wherein decoding the periodic frame $F_j$ includes decoding the periodic frame $F_j$ according to the MPEG-2 standard for video decompression.

34. The computer program product of claim 28 wherein decoding the periodic frame $F_j$ includes decoding the periodic frame $F_j$ according to the MPEG-4 standard for video decompression.

35. A computer program product comprising computer executable instructions embodied in a computer readable medium for performing steps comprising:

(a) transmitting a plurality of frames of compressed video data from a sender to a receiver;

at the sender:

(b) determining a number of forward error correction (FEC) packets for each frame;

(c) transmitting the forward error correction packets for each frame from the sender to the receiver;

(d) monitoring the number of negative acknowledgements received for each frame, and, in response to determining that the number of negative acknowledgements exceeds a predetermined value, retransmitting the packets corresponding to the negative acknowledgments;

at the receiver:

(e) receiving the retransmitted packet and restoring a frame in a frame buffer using the retransmitted packets; and (f) using the restored frame as a reference frame for a frame to be displayed.

36. The computer program product of claim 35 comprising at the sender, setting a periodic temporal dependency (PTDD) value to an initial value sufficiently large to allow recovery of lost packets using the FEC packets.

37. The computer program product of claim 36 comprising, in response to retransmitting the lost or erroneously received packets, setting the PTDD value to a value sufficiently large to allow recovery of lost packets using the retransmitted packets.

* * * * *

UNITED STATES PATENT AND TRADEMARK OFFICE
CERTIFICATE OF CORRECTION

PATENT NO.    : 6,289,054 B1
DATED         : September 11, 2001
INVENTOR(S)   : Injong Rhee It is certified that error appears in the above-identified patent and that said Letters Patent is hereby corrected as shown below:

<u>Title page,</u>
Item [73], Assignee, replace "North Carolina University" with
-- North Carolina State University --.

Signed and Sealed this

Twentieth Day of August, 2002

*Attest:*

JAMES E. ROGAN
*Attesting Officer*      *Director of the United States Patent and Trademark Office*